READING DEVICE FOR POSITION-MEASURING INSTRUMENTS

Filed June 10, 1964

3 Sheets-Sheet 1

INVENTOR
JOHANNES HEIDENHAIN
BY [signature]
ATTORNEY.

Nov. 29, 1966 J. HEIDENHAIN 3,287,810

READING DEVICE FOR POSITION-MEASURING INSTRUMENTS

Filed June 10, 1964 3 Sheets-Sheet 2

INVENTOR
JOHANNES HEIDENHAIN
BY [signature]
ATTORNEY.

INVENTOR
JOHANNES HEIDENHAIN
BY

ATTORNEY.

United States Patent Office 3,287,810

Patented Nov. 29, 1966

3,287,810

READING DEVICE FOR POSITION-MEASURING INSTRUMENTS

Johannes Heidenhain, Egerer, near Chieming, Germany, assignor to Firma Wenczler & Heidenhain, Traunreut, near Traunstein, Germany, a corporation of Germany Filed June 10, 1964, Ser. No. 374,195
Claims priority, application Germany, July 6, 1963, W 34,841
6 Claims. (Cl. 33—125)

The present invention relates to a reading device for position measuring instruments in general and to a device for reading the relative position of two parts longitudinally or rotatably movable relative to each other, in particular. To one the parts a main division having discrete graduation lines and to the other of the parts a reading device are secured, which reading device includes in turn a rotatable disc carrying a marking moving across the main division due to the rotation and an auxiliary division on the rotary disc for the reading of the fractional values of the intervals of the main division.

A known scale-reading device of this type has a marking in the shape of an Archimedean spiral. The disc carrying the spiral scale is to be turned as long until one portion of the spiral coincides with a line of the main division. The fractional value is then read on the auxiliary division. This known scale-reading device has the drawback, that the spiral-shaped marking can be produced very differently with the required exactness, since it constitutes a continuously curved curve, which should be exact on each individual point, that is thus theoretically on infinite many points. In addition, the drawback exists, that in connection with an auxiliary division consisting of numbers only, thus a digital auxiliary division, reading positions having a double meaning are possible. The continuous run of the spiral scale makes it furthermore impossible, that the latter is disposed strictly parallel to the graduation lines of the main division, which would be desirable, however, for an exact and easy reading.

It is one object of the present invention to provide a reading device for position-measuring instruments, which avoids the drawbacks of the known devices.

It is another object of the present invention to provide a reading device for position-measuring instruments, wherein the markings of the rotary disc comprise a plurality of equal markers in discontinuous succession, so that only in predetermined rotary positions of the rotary disc one of these markers is disposed parallel to the graduation lines of the main division, and that these rotary positions coincide with those rotary positions, in which the fractional values are indicated in known manner in fully written numbers. The spiral applied to the rotary disc is discontinuous and the individual markers of the spiral are equal of each other. A marker can be, by example, a single straight line or a double line.

A particularly exact manufacture of the markers on the rotary disc becomes possible such, that they comprise straight sections or are bounded by sections of straight lines. The sections of straight lines can be, for instance, tangents to an Archimedean spiral.

It is already known to use though in so-called transversal scales stepped markings. All individual markings are, however, thereby parallel to the graduation lines of the main division. In the measuring, different points of these very long lines of the main division are used, which is detrimental to the exactness. Furthermore, it is not possible in the known transversal scales to bring the number value to be read into the field of vision. The above disclosed arrangement of the present invention avoids also the drawbacks of these known transversal scales.

Particularly advantageous arrangements of the inventive principle result such, that (a) The rotary disc consists of a glass disc, the markers of which slide directly on the division face of a slide-gauge, (b) The graduation lines of the main division are imaged at an enlarged scale on the rotary disc by an optically projecting system.

The embodiments of the present invention stated under (a) and (b) are disclosed in the following description.

With these and other objects in view, which will become apparent in the following detailed description, the present invention will be clearly understood in connection with the accompanying drawings, in which.

Figures 1, 2, 3, 4, 5:
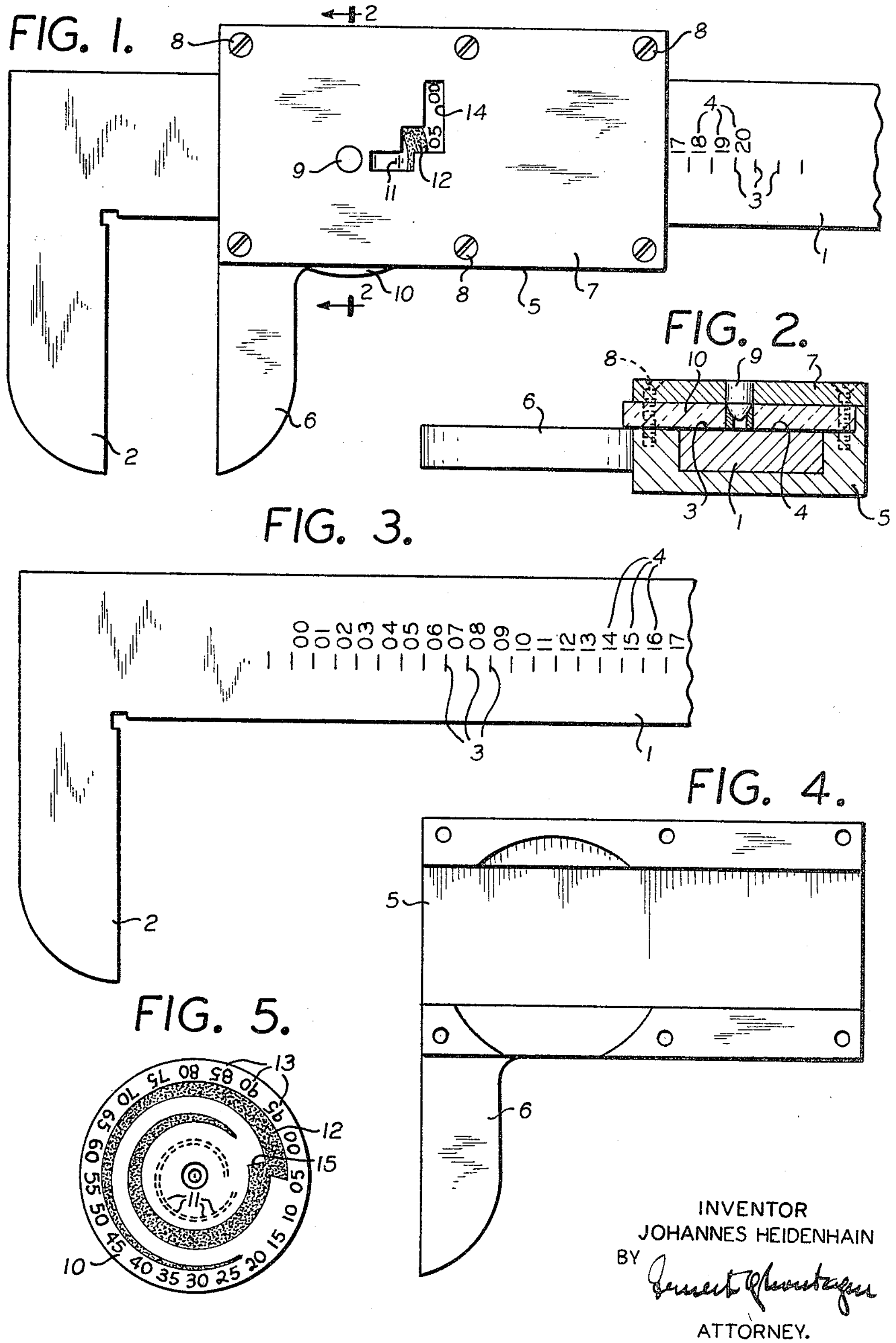
FIGURE 1 is an elevation of a slide-gauge, designed in accordance with the present invention.
FIG. 2 is a section along the lines 2—2 of FIG. 1.
FIGS. 3 to 6 are elevations of the respective parts in the slide-gauge disclosed in FIG. 1.

Referring now to the drawings, and in particular to FIG. 1 to 6, the slide-gauge comprises a shaft 1, which carries one of the measuring shoes 2, the division of graduation lines 3, as well as a numbering 4. A slide 5 moves along the shaft 1, which forms the other measuring shoe 6. A covering plate 7 is connected with this slide 5 by means of screws 8. A bearing pin 9 is secured to the covering plate 7, which pushes a glass disc 10 toward the upper side of the shaft 1, however; with such pressure only, that the disk 10 can easily be rotated by hand. The glass disc 10 carries on its lower face, which slides along the upper face of the shaft 1, a marking 11, applied in a manner safe against scratches, a covering plate 12, as well as an auxiliary division 13 consisting of numbers only. In the recess 14 of the cover plate 7 an appropriately shaped lens is glued in, which operates as a magnifying glass and which permits to visualize at an enlarged scale the portions visible through the recess 14.

The measuring of an unknown measure is performed as follows:

Upon sensing of the object to be measured with the measuring shoes 2 and 6, the slide 5 stands in the position to be read. At least, but not more than two of the lines 3 and of the numbers 4 are visible in the recess 14. By rotation of the disc 10 (while the slide 5 stands still), that marking 11 overlies one of the lines 3, which provides the best possible symmetry position of this line in the double lined marking 11. The correct fractional value appears then as one number of the row 13 in the recess 14. By the arrangement according to the present invention of the marking 11 it is assured, that always a value, having a single meaning, of the row 13 is readable.

In order to set the slide 5 to a predetermined measure, simply that number of the row 13 is brought into the recess 14, which corresponds with the desired fractional value. Then it is necessary to catch merely the desired line of the row 3 by means of the marking 11 standing parallel to this line by displacement of the slide 5.

In order to avoid errors, which could come about upon transfer from one of the lines 3 to the next, the covering diaphragm 12 is provided. In the position shown in FIG. 1, the diaphragm 12 covers the number "04" of the row 4. If, however, the disc 10 is turned ahead one step, so that no more the number "00," rather the number "95" of the row 13 appears, the edge 15 of the diaphragm 12 (see FIG. 5) frees the number "04" of the row 4, while now the number "05" of this row is covered up by the diaphragm 12.

Figures 6, 7:
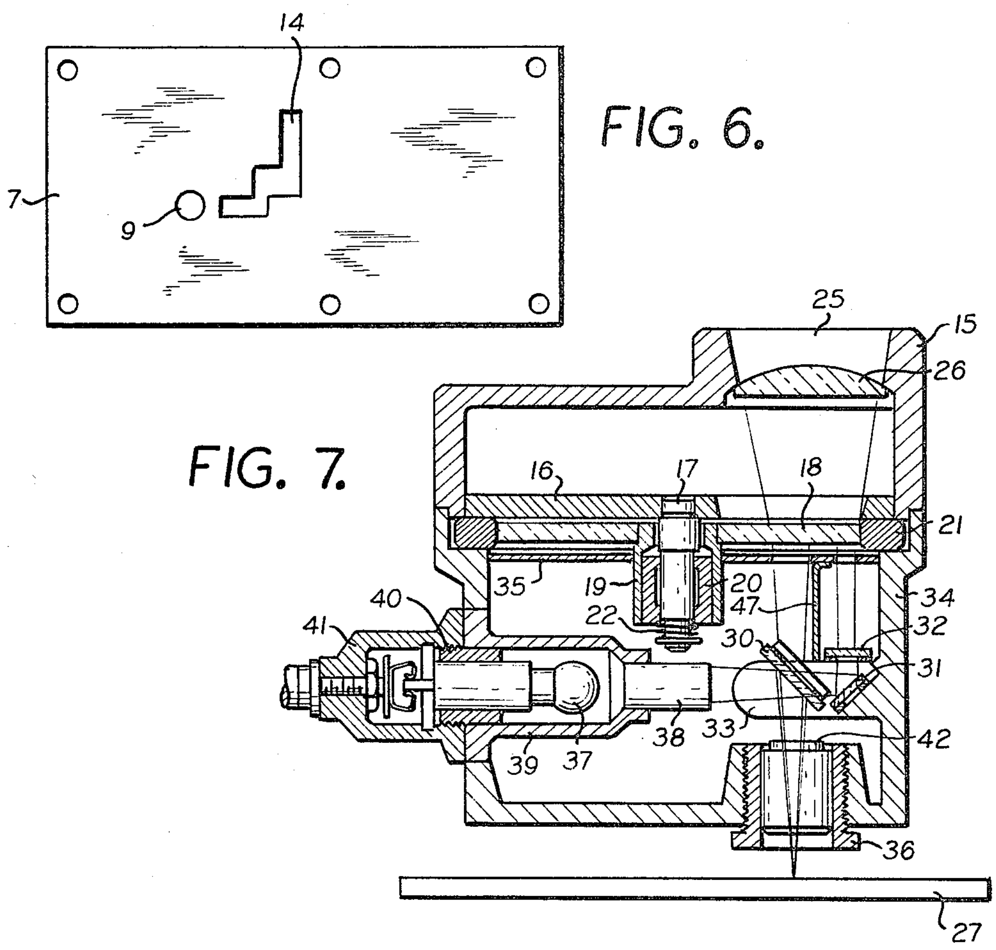
FIG. 7 is a vertical section of an optical measuring instrument, designed in accordance with the present invention.
Figure 8:
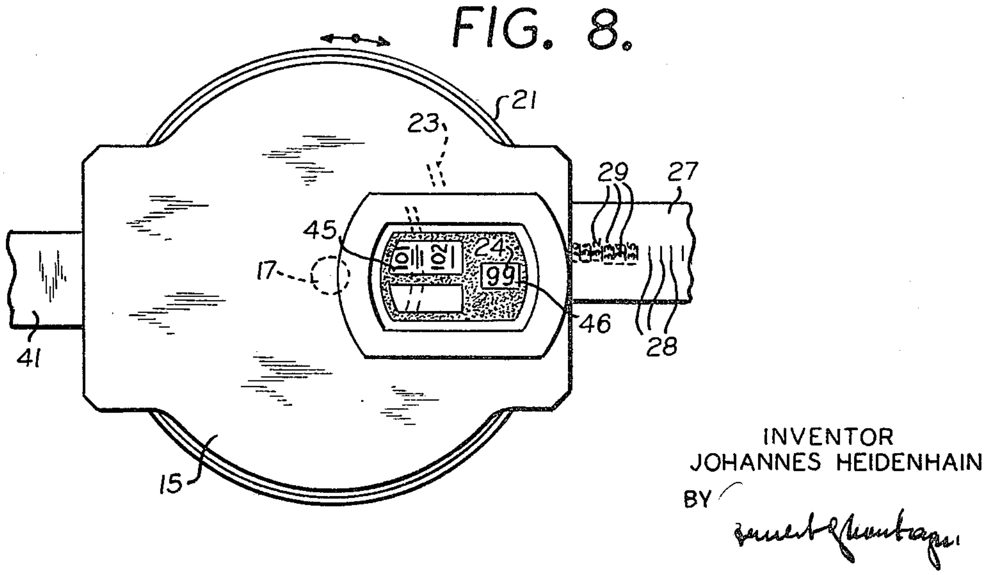
FIG. 8 is a top plan view of the measuring instrument disclosed in FIG. 7.
Figure 9:
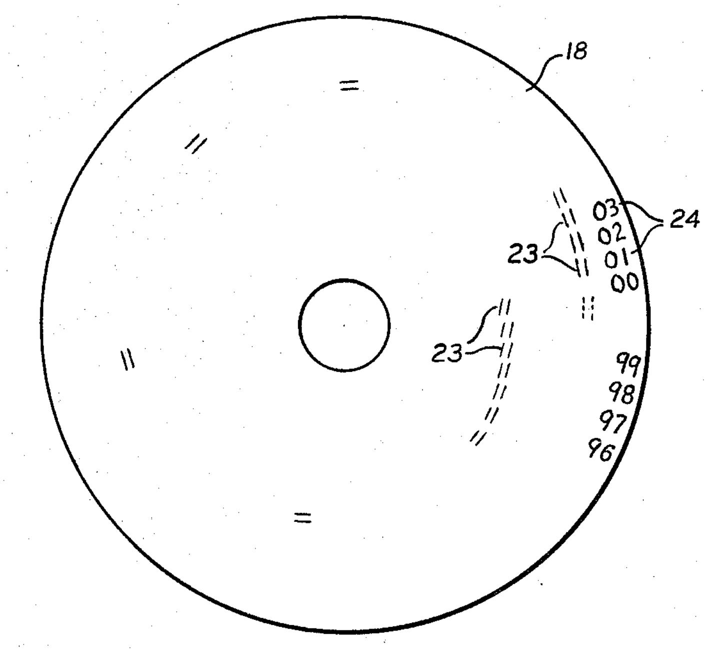
FIG. 9 is a fragmentary elevation of a particular member of the instrument disclosed in FIG. 7.

The optical measuring device is disclosed in FIGS. 7 to 9. The optical measuring device comprises a housing 15 to which a disc 16 is secured. An axle 17 is mounted on the disc 16. A glass disc 18 is rotatably mounted on the axle 17 by means of a bushing 19 and a bearing 20. An adjustment ring 21 is cemented to the outer periphery of the glass disc 18, which adjustment ring 21 is pressed toward the bottom side of the disc 16 by means of a spring 22, however, with such force only, that the glass disc 18 connected with the adjustment ring 21 can easily be rotated by hand.

The glass disc 18 carries, as disclosed in FIG. 9, a marking 23 on its dulled bottom side, as well as an auxiliary division consisting only of numbers. An appropriately shaped lens 26 is cemented into a recess 25 of the housing 15, which operates as a magnifying glass, which permits the viewing of portions at an enlarged scale through the recess 25.

The line marks 28 applied on the measuring rod body 27 of the main division, as well as the numbers 29 coordinated thereto are projected onto the dulled bottom side of the glass disc 18 carrying the marking 23 (FIG. 9) by means of an optical system comprising a lamp 37, a condenser 38, a partly transparent mirror 30 and and objective 42, and in particular such, that the division interval of the main division defined by the distance between two adjacent division marks 28 corresponds with the pitch of the Archimedean spiral.

The auxiliary division 24 is lit by the lamp 37 through the condenser 38, the partly transparent mirror 30, a mirror 31 and a dulled disc 32. The diffused light produced by the dulled disc 32 is screened against the flow of the rays of the optically projecting system by means of the separation wall 47. The flow of the rays is limited by the diaphragm 35 secured in a housing 34. The partly transparent mirror 30, the mirror 31 and the dulled disc 32 are mounted on a projecting lug 33 of the housing 34.

The objective 42 is secured to the housing 34 by means of a threaded bushing 36.

The condenser 38 is secured to a holder 39 projecting inwardly into the housing 34, and a socket of the lamp 37 is secured to a portion 41 projecting outwardly from the housing 34 by means of a nut 40.

The measuring of an unknown measure is performed as follows:

As shown in FIG. 8, two lines 28 and the corresponding numbers 29 are visible in the recess 45 of the diaphragm 35. By rotation of the ring 21 connected with the glass disc 18 that part of the marking 23 is superposed one of the lines 28, which results in the best possible symmetrical position of this line 28 in the double line 23.

The correct fractional value appears then as a number of the row 24 in the recess 46 of the diaphragm 35.

In order to set a desired measure, simply that number of the row 24 is brought into the recess 46 of the diaphragm 35, which corresponds with the desired fractional value. It is then only necessary, that the desired line of the row 28 is caught by means of the markings 23 disposed parallel to this line by displacement of the measuring device relative to the division carrier 27.

As a further development of the arrangement set forth above, the determination of the coincidence between the marking 23 of the micrometer and the marking 28 of the main division is also possible by photoelectric, inductive or capacitive means.

While I have disclosed one embodiment of the present invention, it is to be understood that this embodiment is given by example only and not in a limiting sense, the scope of the present invention being determined by the objects and the claims.

I claim:

1. A device for reading the relative position of two parts movable relatively to each other by a longitudinal and rotatable movement, respectively, comprising
   - a first member carrying a main division including discrete graduation lines,
   - a second member carrying a reading device, said reading device including a rotatable disc carrying a marker moving across said main division due to its rotation, and having an auxiliary division for reading the fractional values of said main division,
   - the marker of said rotary disc comprising a plurality of markers equal to each other in discontinuous succession, so that only in predetermined rotary positions of said rotary disc one of said markers is disposed parallel to the graduation lines of said main division, and
   - said rotary positions coincide with those rotary positions, in which the fractional values are indicated on said auxiliary division in full numbers.

2. The device, as set forth in claim 1, wherein said markers of said rotary disc are bounded by sections of straight lines.

3. The device, as set forth in claim 1, wherein said markers of said rotary disc comprise sections of straight lines.

4. The device, as set forth in claim 3, wherein said sections of straight lines are tangents of an Archimedean spiral.

5. The device, as set forth in claim 1, wherein said rotary disc is a glass disc having said markers, and said markers slide directly on the division face of a slide-gauge.

6. The device, as set forth in claim 1, which includes an optically projecting system projecting at an enlarged scale said graduation lines of said main division on said rotary disc carrying said markers.

References Cited by the Examiner

UNITED STATES PATENTS

| | | | |
|---|---|---|---|
| 2,034,804 | 3/1936 | Gamroth | 33—147 |
| 2,397,981 | 2/1950 | Gramont | 33—1250 X |
| 3,182,403 | 5/1965 | Zwick | 33—143 |

LEONARD FORMAN, *Primary Examiner.*

H. N. HAROIAN, *Assistant Examiner.*